United States Patent Office 3,289,041
Patented Nov. 29, 1966

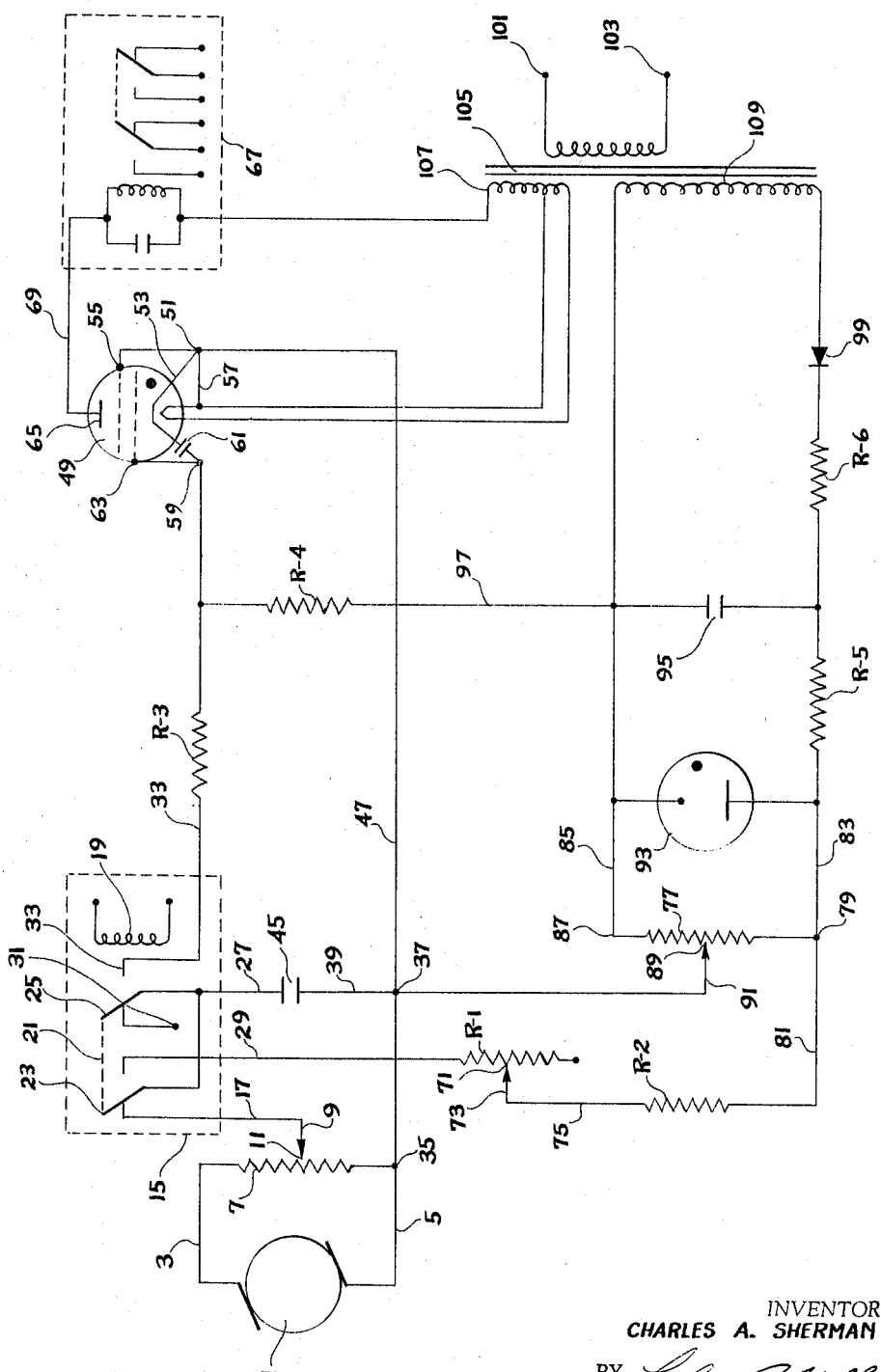

3,289,041
ELECTRONIC TIME DELAY MECHANISM
Charles A. Sherman, Tacoma, Wash., assignor to Weyerhaeuser Company, Tacoma, Wash., a corporation of Washington
Filed Dec. 11, 1963, Ser. No. 329,726
6 Claims. (Cl. 317—5)

This invention relates to control apparatus and particularly to speed compensating control apparatus.

In some machines the exact position of a moving member is required to insure proper performance of the next operation of that machine. Until now there has not been an automatic means for compensating for varying speeds of such a moving member. For example, in a machine where a work piece is conveyed from one station to another station there is a malfunction of the machine whenever the conveying means slows down so that the work piece is not properly positioned at the next station at the time that the work performed at that station commences.

It is an object of this invention to provide control apparatus which compensates for varying speeds of a moving member of a machine to control other machine operations which depend upon the exact position of the moving member.

It is a further object of this invention to provide control apparatus which receives a signal voltage proportional to the speed of the moving member of the machine being controlled and delays a control command a time increment proportional to the amount the moving member's speed is below a standard speed.

It is a further object of this invention to provide a control apparatus which includes a generator which is driven at a speed proportional to a conveyor speed and which charges a capacitor to a voltage proportional to the conveyor's speed. Upon the actuation of a control command relay the charged capacitor is connected to a control grid of a thyratron tube which when ionized transmits the control command to a control relay. The capacitor is also connected to a charging circuit which will continue to charge the capacitor if required until the charge on it reaches the ionizing voltage of the thyratron.

A still further object of this invention is to provide a control apparatus which includes a generator which is driven at a speed proportional to a conveyor's speed and which charges a capacitor to a voltage proportional to the conveyor's speed. Upon the actuation of a control command relay the stored voltage of the charged capacitor is impressed upon the control grid of a thyratron tube ionizing the thyratron tube which actuates its control relay to carry out the command control. If the capacitor charge is below the ionizing voltage for the thyratron tube, the capacitor receives the needed charge from a charging circuit in a time delay period equal to the time required for the under speed conveyor to reach the position required for the proper execution of the commanded control.

In the practice of this invention a generator is driven at a speed proportional to the speed of the moving member of a machine being controlled by the control apparatus. The generator charges a capacitor until a command signal actuates a command relay which connects the charged capacitor to a charging circuit and to a control grid of a thyratron tube. If the moving member is operating at the standard speed, the capacitor will receive a sufficient charge from the generator to ionize the thyratron tube to execute the controls operated by the thyratron whenever the command signal actuates the command relay. If, however, the moving member is operating at 10% below the standard speed the capacitor will receive only 90% of the needed charge from the generator to ionize the thyratron tube and there will be a delay in the execution of the control command signal until the charging circuit charges the capacitor to the 100% of the needed charge and this delay is equal to the additional time required for the moving member of the machine to reach the required position for the proper execution of the commanded control signal.

How the foregoing objects, together with such other objects as may appear hereafter or are incident to my invention, are attained, is illustrated in the preferred form in the accompanying drawing. Various changes may be made, however, in the construction and arrangement of parts in the apparatus and certain features may be used without the use of other features. All such modifications are intended to be within the scope of the appended claims.

The figure shows a schematic diagram of the control circuit of the control apparatus.

In more detail the figure shows a generator 1 which is connected by charging leads 3 and 5 to a voltage divider 7. A voltage pickoff arm 9 makes contact with the voltage divider 7 at a point 11 and is connected to a command relay 15 by a relay lead 17. As indicated by the dashed lines, the command relay 15 includes coil 19 which receives command signals to pull relay yoke 21 from a normal, unactuated, left-hand position, as shown, to an actuated, right-hand position. Yoke 21 is mechanically linked to relay arms 23 and 25 which are commonly connected to capacitor lead 27. Arm 23 in the normal position makes contact with relay lead 17 and in the right-hand position makes contact with time delay charging lead 29. Arm 25 in the normal position makes contact with relay blank contact 31 and in the actuated position makes contact with control lead 33.

The charging lead 5 continues past junction 35 to junction 37 to connect with capacitor lead 39 and the lower side of the capacitor 45. The upper side of capacitor 45 is connected to command relay 15 by capacitor lead 27.

From junction 37 cathode lead 47 completes the circuit to the thyratron tube 49 to junction 51 where the cathode 53, the shield grid 55 and the filament 57 elements make a common connection. Between the junction 59 and the cathode 53 is a transient suppressor capacitor 61. Beyond junction 59 the control lead 33 connects with control grid 63. The last element of the thyratron 49 is anode 65 which connects with the execution relay 67 by means of anode lead 69.

From the command relay 15 the time delay charging lead 29 connects with the variable resistor R–1 which connects at point 71 with slow speed arm 73. Base time delay resistor R–2 is connected to slow speed arm 73 by means of lead 75 and to voltage divider 77 at junction 79 by means of lead 81.

Voltage divider 77 is connected between positive voltage lead 83 at junction 79 and negative voltage lead 85 at junction 87 making contact at point 89 with voltage pickoff arm 91 which in turn is connected with capacitor lead 39. Also connected between positive voltage lead 83 and negative voltage lead 85 are voltage control tube 93 and voltage stabilizing capacitor 95.

Bias lead 97 includes bias resistor R–4 and links control lead 33 which includes control resistor R–3, to negative voltage lead 85. Halfway rectifier 99 is in series with resistors R–5 and R–6 being connected by positive voltage lead 83. Alternating current supply leads 101, 103 serve the power requirements of the control apparatus through transformer 105 and secondaries 107 and 109.

Operation

The speed of the machine being controlled by the speed compensating control apparatus may vary from the standard speed to any speed below the standard speed and in order to prevent malfunction of the machine the speed compensating control apparatus corrects for substandard speeds by delaying a command signal for an increment of time equal to the time required for the moving member to position itself properly for the execution of the control operation commanded.

In the speed compensating control apparatus the generator 1 is rotated at a speed proportional to the speed of the moving member of the machine being controlled. The generator 1 charges capacitor 45 to a voltage proportional to the speed of the generator 1. Upon receipt of a command signal, the command relay coil 19 is energized breaking contact between the generator 1 and the capacitor 45 and making contact between the time delay charging lead 29 and the capacitor 45 and the thyratron control grid 63 and the capacitor 45. If just prior to the receipt of the command signal, the generator 1 is rotated at a standard speed, the capacitor has a sufficient voltage to impress through the control lead 33 to ionize the thyratron 49 resulting in the actuation of the execution relay 67 without any time delay. If, however, the moving member of the machine being controlled is moving at a speed below the standard speed, the generator 1 is not able to put sufficient voltage charge upon the capacitor 45 but can only place a charge on capacitor 45 of a magnitude proportional to the speed of a moving member. Thus, when the command relay 15 becomes actuated, the capacitor 45 does not have sufficient voltage to ionize the thyratron 49 until an additional charge has been placed upon it. This additional charge is placed upon the capacitor 45 by means of the time delay charging circuit which includes the constant voltage source between the positive voltage lead 83 and the negative voltage lead 85 which provides current through the variable resistor R-1 and the base time delay resistor R-2. The increment of time required to bring capacitor 45 up to the ionization voltage of the control thyratron 49 is dependent upon the amount of charge placed upon the capacitor 45 prior to the actuation of the command relay 15 and the magnitude of the combined resistance of the variable resistor R-1 and the base time delay resistor R-2. Since the voltage between the positive voltage lead 83 and the negative voltage lead 85 is kept constant by means of voltage control tube 93, it is possible to vary the time delay for charging the capacitor 45 by varying the amount of resistance of variable resistor R-1. Once set the variable resistor R-1 need not be changed except to accommodate changes in the machine being controlled.

Having now described by invention and in what manner the same may be used, what I claim as new and desire to protect by Letters Patent is:

1. A speed-compensating control apparatus comprising in combination
   capacitor means
   first means for charging said capacitor means to a voltage proportional to the speed of the machine element being compensated for
   means for energizing a control execution relay to actuate the apparatus being controlled
      said energizing means being inoperative below a standard voltage
   second means for charging said capacitor to said standard voltage
   command control means for receiving a command control signal and, upon receipt of said signal, for disconnecting said first charging means from said capacitor means and for connecting said energizing means and said second charging means with said capacitor means whereby said capacitor means discharges through said energizing means responsive to said capacitor means being charged to said standard voltage by said first and second charging means.

2. The apparatus of claim 1 wherein
   said first charging means charging said capacitor means to said standard voltage whenever said machine element operates at a standard speed.

3. The apparatus of claim 2 wherein
   said first charging means being a generator means operatively connected with said machine element.

4. The apparatus of claim 1 wherein
   said second charging means including a constant voltage source means in series with a resistor means.

5. The apparatus of claim 4 wherein
   said resistor means includes a variable resistor for adjusting the time delay for charging said capacitor means to said standard charge.

6. A speed compensating control apparatus comprising in-combination
   capacitor means
   first means for charging said capacitor means to a voltage proportional to the speed of the machine element being compensated for
      said first charging means charging said capacitor means to a standard voltage whenever said machine element operates at a standard speed
      said first charging means being a generator means operatively connected to said machine element
   means for energizing a control execution relay to actuate the apparatus being controlled
      said energizing means being inoperative below said standard voltage
   second means for charging said capacitor means to said standard voltage
      said second charging means including a constant voltage source in series with a resistor means
      said resistor means including a variable resistor
   command control means for receiving a command control signal and, upon receipt of said signal, for disconnecting said first charging means from said capacitor means and for connecting said energizing means and said second charging means with said capacitor means whereby said capacitor means discharges through said energizing means responsive to said capacitor means being charged to said standard voltage by said first and said second charging means.

References Cited by the Examiner
UNITED STATES PATENTS

| | | | |
|---|---|---|---|
| 2,203,468 | 6/1940 | Martin | 317—142 X |
| 2,621,808 | 12/1952 | Blakeney | 317—142 X |
| 2,818,532 | 12/1957 | Aitel | 317—142 X |

MILTON O. HIRSHFIELD, *Primary Examiner.*

J. A. SILVERMAN, *Examiner.*